US009192883B1

(12) United States Patent
Blichmann (10) Patent No.: US 9,192,883 B1
(45) Date of Patent: Nov. 24, 2015

(54) COMBINED WINE FERMENTOR AND PRESS (76) Inventor: John Richard Blichmann, Lafayette, IN (US)

( * ) Notice: Subject to any disclaimer, the term of this patent is extended or adjusted under 35 U.S.C. 154(b) by 509 days.

(21) Appl. No.: 13/506,810

(22) Filed: May 18, 2012

(51) Int. Cl.
*B01D 43/00* (2006.01)
*C12C 13/10* (2006.01)
*C12C 7/17* (2006.01)

(52) U.S. Cl.
CPC . *B01D 43/00* (2013.01); *C12C 7/17* (2013.01); *C12C 13/10* (2013.01)

(58) Field of Classification Search
CPC ............ B01D 43/00; C12C 13/10; C12C 7/17
USPC ........ 426/11, 14–15; 99/276–278; 435/291.1, 435/292.2, 291.2; 220/579–580
See application file for complete search history.

(56) References Cited

U.S. PATENT DOCUMENTS

| 4,512,251 | A | * | 4/1985 | Green | 99/472 |
| 2006/0180591 | A1 | * | 8/2006 | Porter | 220/580 |
| 2008/0311262 | A1 | * | 12/2008 | Blichmann | 426/489 |

* cited by examiner

*Primary Examiner* — Tu B Hoang
*Assistant Examiner* — Michael Hoang (57) ABSTRACT

A combined fermentor and press assembly. The combined fermentor and press assembly includes a pot, container or bag having a preestablished volume "V" defined therein. A must and a future pomace being positioned in said preestablished volume "V". A drain space "DS" defined within the preestablished volume "V" and a drain system, consisting of tubes and valves connected to a receptacle and a pump drawing a liquid from the must and the future pomace.

11 Claims, 5 Drawing Sheets

COMBINED WINE FERMENTOR AND PRESS

TECHNICAL FIELD

This invention relates generally to a process of draining and separating a liquid or "free run" wine, juice or spirits from spent grape skins, seeds and other pulp material, must, and a future further generally solid portion, pomace, such as by gravity, siphon or a pump, and further removing liquid or wine from the pomace.

BACKGROUND

It is well known in the wine making industry to use a press for separating the fermented wine from the spent grape skins, seeds and other pulp material known in the art as must and the further resulting generally solid portion, pomace. The wine is then transferred to a second fermenting vessel for further aging and processing. The process of this separation is twofold. First, the "free run" wine is drained from the fermenting vat or must on its own accord using gravity, siphon, or a pump. Second, the remaining must and a future pomace, which is quite moist and contains a significant volume of wine, is transferred (scooped or pumped) out of the vat and placed into the press to remove the majority of remaining wine from the pomace. It is also well known in the art that exposure to air (containing oxygen) will cause staling, oxidation, and other poor qualities to the finished wine. In addition, exposure to contaminants (bacteria and wild yeasts) from the atmosphere and surfaces of the press will cause undesirable flavors to form in the finished wine. For centuries a basket press (also known as ratchet press) was used to press the wine from the must and the future pomace. This is simply a series of vertical slats of wood aligned in a cylinder shape with small gaps between each slat for the wine to flow through. A wood disc is place on top and a crank (ratchet) is used to apply mechanical force (pressure) to the pomace thereby squeezing the wine through the gaps between the slats and maintaining the solids inside the basket. More modern presses use a perforated cylinder in lieu of the slats and may also use and expanding balloon instead of a mechanical crank. These are known in the art as bladder presses. All the current methods of separating the wine from the pomace involve transferring the pomace into a second vessel and, as such, add significant risk to the exposure of the wine to contamination and oxidation.

Thus, a better process and procedure is needed and desirable to drain "free run" wine and spirits and the remaining wine or spirits from must and the future pomace more efficiently, effectively and a lesser chance of producing an undesirable flavor and other poor qualities to the finished wine.

The present invention is directed to overcome one or more of the problems as set forth above.

SUMMARY OF THE INVENTION

In one aspect of the invention a method of separating a liquid from an unfermented must or crushed fruit and a resulting future pomace is disclosed and comprises the steps of: placing the unfermented must or crushed fruit and resulting future pomace into a container, the container has a preestablished volume "V" and an inlet; forming a drain space "DS" within the preestablished volume "V"; allowing the must or crushed fruit to ferment within at least a portion of the preestablished volume "V" of the container; connecting an inlet end of a first tube within the drain space "DS"; positioning an outlet end of the first tube within a receptacle, the receptacle has a volume retention portion, an inlet and outlet end, and the outlet end of the first tube is positioned within the volume retention portion; positioning a first end of a second tube within the receptacle; attaching a second end of the second tube to a pump; sealing the inlet of the container with the first tube intermediate the inlet end and the outlet end of the first tube sealingly connecting the container and the first tube; actuating the pump creating at least a partial vacuum within the drain space "DS"; drawing the liquid from the must and the resulting future pomace and dispensing the liquid into the volume retention portion of the receptacle.

In another aspect of the invention a method of separating a liquid from an unfermented must or crushed fruit and a resulting future pomace is disclosed and the method of separating comprises the steps of: positioning a spacer within a pot, the pot has an inlet and a preestablished volume "V" and the spacer within the pot forms a drain space "DS" within the preestablished volume "V"; positioning a false bottom within the pot, the false bottom being in contacting relationship with the spacer and the false bottom being capable of permitting a flow of liquid therethrough; positioning the must and the future pomace within the pot, the must and the future pomace being in contacting relationship with the false bottom; allowing the must to ferment within at least a portion of the preestablished volume "V" of the pot; positioning a sealing member within the pot, the seal member sealingly connecting with an inside of the pot; connecting an inlet end of a first tube to the drain space; connecting an outlet end of the first tube to a receptacle, the receptacle having a volume retention portion and an inlet and outlet end, and the outlet end of the first tube being positioned within the volume retention portion; positioning a first end of a second tube within the receptacle; attaching a second end of the second tube to a pump; actuating the pump creating at least a partial vacuum within the drain space "DS"; drawing the sealing member into further contacting relationship with the must and the resulting future pomace; drawing the liquid from the must and the resulting future pomace and dispensing the liquid into the volume retention portion of the receptacle.

In another aspect of the invention a combined fermentor and press assembly is disclosed. The fermentor and press assembly is adapted to allow fermentation and separation of a liquid from an unfermented must or crushed fruit and a resulting future pomace, comprises: a pot, the pot has a top or inlet, a bottom, an inside and a preestablished volume "V", the pot has a ledge spaced from the bottom forming a shelf within the preestablished volume "V", a drain hole is positioned in the pot; a flow stopping devise is connected to the drain hole in the pot, the flow stopping device is moved between an open position and a closed position; a spacer is positioned in the pot and is in contact with the bottom; a false bottom is positioned in the pot, the false bottom has the capability of permitting a flow of liquid therethrough; a drain space is created between the false bottom and the bottom of the pot, the drain space and the valve are in fluid communication; the must and the resulting future pomace is added within at least a portion of the preestablished volume "V"; allowing the must to ferment within at least a portion of the preestablished volume "V" of the pot; a sealing member is positioned within the pot within the preestablished volume "V", an outer circumference is spaced from the inside of the pot, a sealing mechanism is positioned between the outer circumference and the inside of the pot; an inlet end of a first tube is attached to the valve and an outlet end of the first tube is connected to a receptacle, the receptacle has a volume retention portion; a first end of a second tube is connected to the volume retention portion of the receptacle and a second end of the second tube is connected to a pump.

In another aspect of the invention a method of separating a liquid from a must and a resulting future pomace within a fermentor is defined. The method of separating comprises the steps of: placing the must and the resulting future pomace into a container, the container has a preestablished volume "V" and an inlet; forming a drain space "DS" within the preestablished volume "V"; connecting an inlet end of a first tube within the drain space "DS"; placing an outlet end of the first tube within a receptacle, the receptacle has a volume retention portion and an inlet end, the outlet end is positioned within the volume retention portion; connecting a pump intermediate the inlet end of the first tube and the outlet end of the first tube; actuating the pump and draining the liquid from the container and into the receptacle.

DETAILED DESCRIPTION

Figure 1:
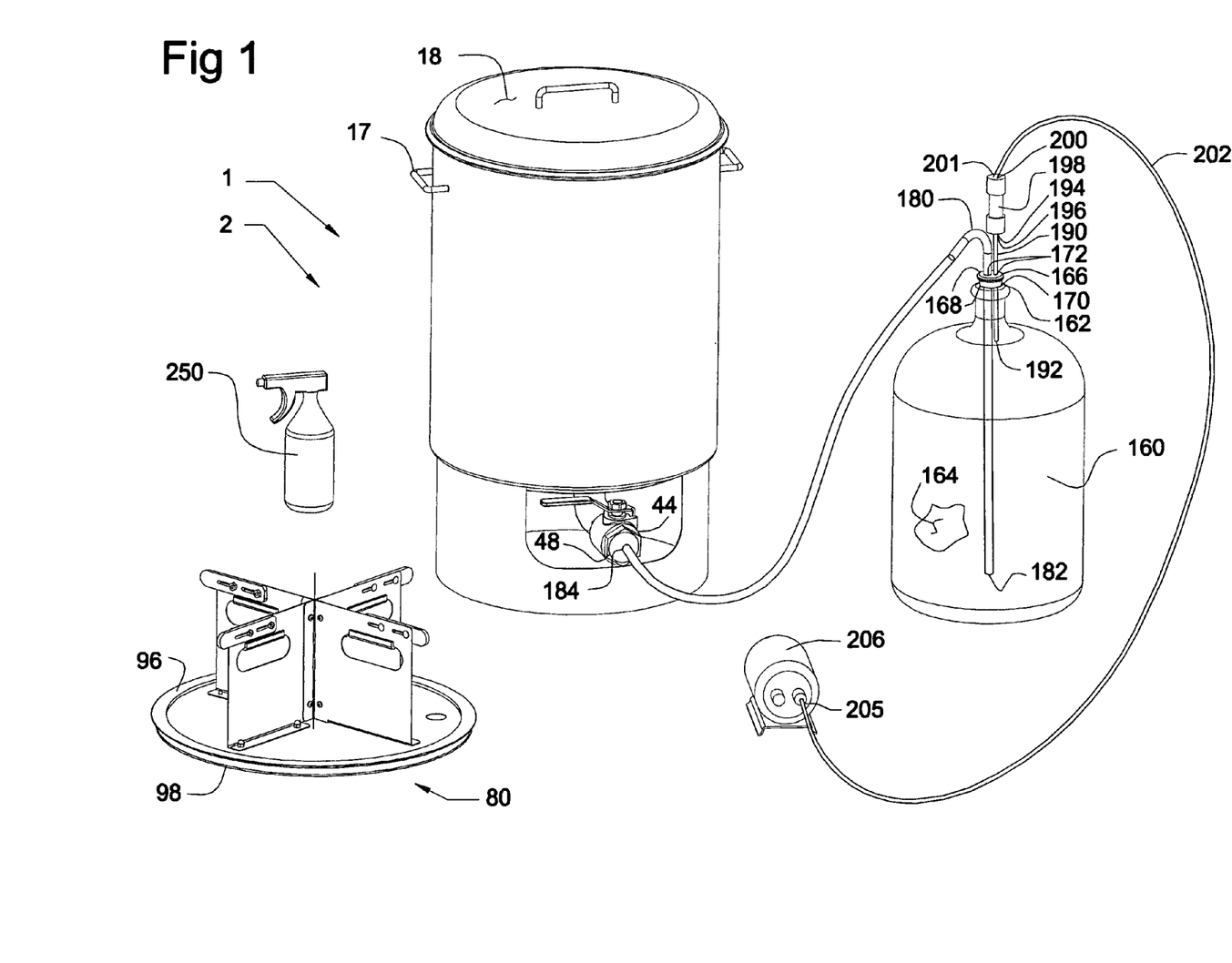
FIG. 1 is an exploded pictorial view of the fermentor and press assembly or mechanism.

In one embodiment of the invention, as best shown in FIG. 1, a fermentor and press assembly 1 is shown. As further shown in FIG. 2, a pot assembly or container 2 defines a pot 4. The pot 4 has a top or inlet 6 and a bottom 8, and in this application, the pot 4 has a generally circular configuration is generally constructed to resist collapsing and a pressure and is defined by a wall member 10 having an inside 12 and an outside 14. Defined within the top 6, the bottom 8 and the inside 12 is a preestablished volume "V" being capable of having a fermentable fruit or must 15 resulting in the future pomace 16 disposed at least partially within the preestablished volume "V". A pair of handles 17 are attached near the top 6 of the pot 4. A lid 18 is positioned at the top 6 of the pot 4 and is a part of the pot assembly 2. A ledge 20 is positioned near the bottom 8. The ledge 20 is spaced from the bottom 8 a preestablished distance and forms a shelf 22 within the preestablished volume "V". As an option, the ledge 20 and the shelf 22 can be eliminated with another design. With the alternate design, the preestablished volume "V" needs to be provided. The ledge 20 forms a recess 24 near the bottom 8 and is external of the preestablished volume. A stud 26 is attached to the bottom 8 and is positioned at least partially within the preestablished volume "V". A drain hole 28 is positioned in the bottom 8 and extends between the preestablished volume "V" and the outside or is accessible external of the bottom 8. As an alternate, the drain hole 28 could be place in the wall member 10 and have a member (not shown) extending into the recess 24.

Figure 2:
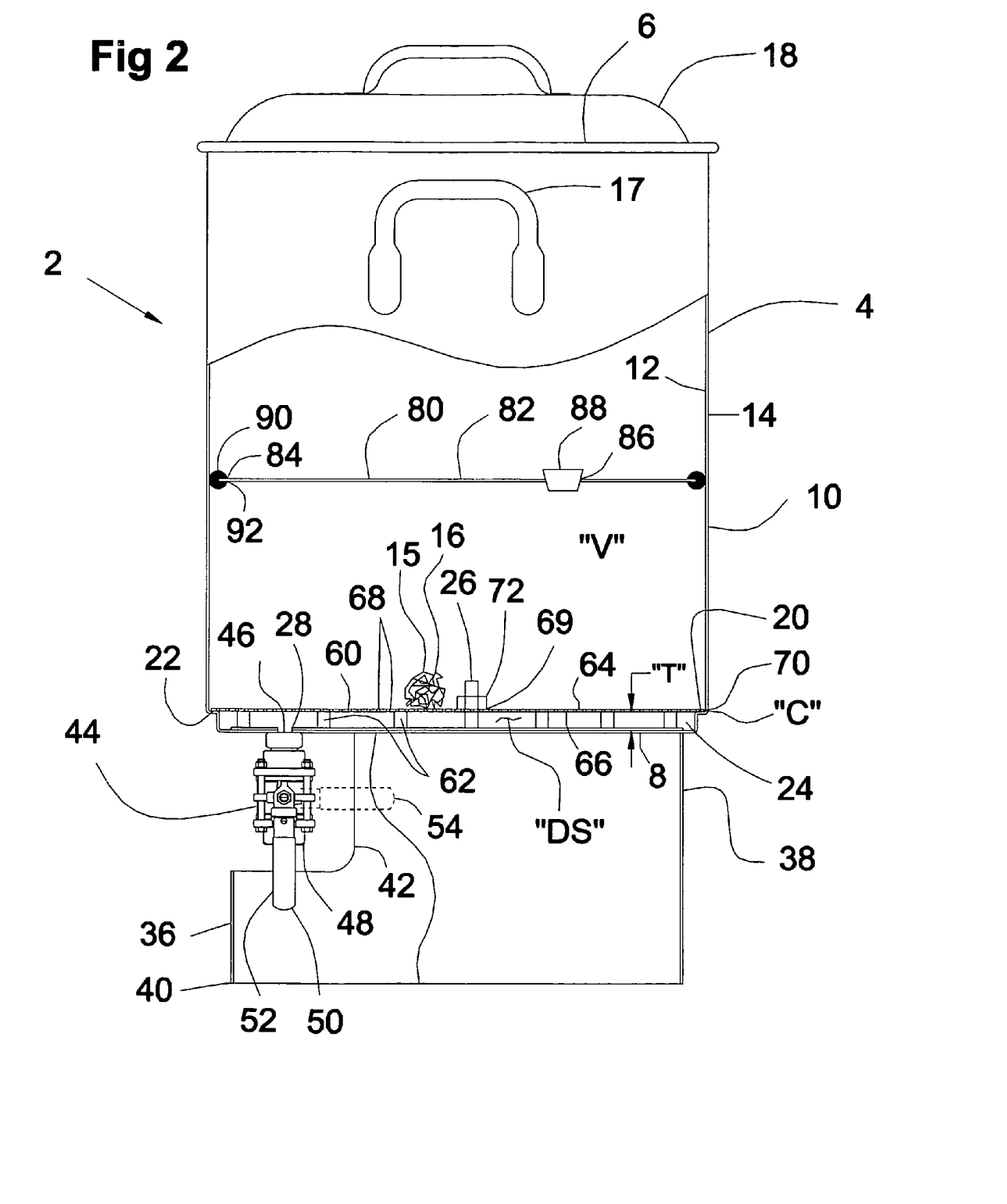
FIG. 2 is a partially sectioned view of the pot assembly.

As further shown in FIG. 2, the pot assembly 2 is positioned on a base 36. The base 36 has a top portion 38 in contact with the recess 24 of the bottom 8. Spaced from the top portion 38 a preestablished distance is a bottom portion 40. A slot 42 having a generally "U" configuration extends from the top portion 38 toward the bottom portion 40 and is positioned within the preestablished distance and, in operation, is aligned with the drain hole 28. A flow stopping device or in this application a drain valve 44 has a first end 46 removably positioned within the drain hole 28 and a second end 48 extending externally of the base 36. A valve lever 50 having an open position 52 and a closed position 54, shown in phantom, is interposed the first end 46 and the second end 48. The valve lever 50, in operation, is physically accessible externally of the base 36 and is infinitely rotatable between the open position 52 and the closed position 54. As an option, the drain valve 44 could be a simple "on-off" configuration and would not necessarily need to be positioned externally but needs to be accessibly to rotate the lever 50 or actuate the valve.

The pot assembly 2, as best shown in FIG. 2, further includes a false bottom 60 and a spacer mechanism 62. The spacer mechanism 62 is positioned between the bottom 8 of the pot 4 and the false bottom 60 within the preestablished volume "V" and contacts the bottom 8. The spacer mechanism 62 has a preestablished thickness "T". The false bottom 60 has a top surface 64 and a bottom surface 66. Extending between the top surface 64 and the bottom surface 66 is a plurality of openings 68 having a preestablished volume or size. The plurality of openings 68 have the capability of permitting a flow of liquid therethrough. A hole 69 is positioned between the top surface 64 and the bottom surface 66 and is aligned with the stud 26. As an alternative design, the stud 26 and the hole 69 could be eliminated. An outer portion 70 of a circumference "C" of the false bottom 60 is void of the plurality of openings 68. The outer portion 70 of the false bottom 60 is positioned on the shelf 22. With the bottom surface 66 in contact with the spacer mechanism 62 and the shelf 22, and the hole 68 aligned with the stud 26 a nut 72 is assembled on the stud 26 positioning the bottom 8 of the pot 4, the spacer mechanism 62 and the false bottom 60 thus, creating a drain space "DS" between the false bottom 60 and the bottom 8 of the pot 4. The drain space "DS" is in liquid communication with the drain valve 44.

Figure 3:
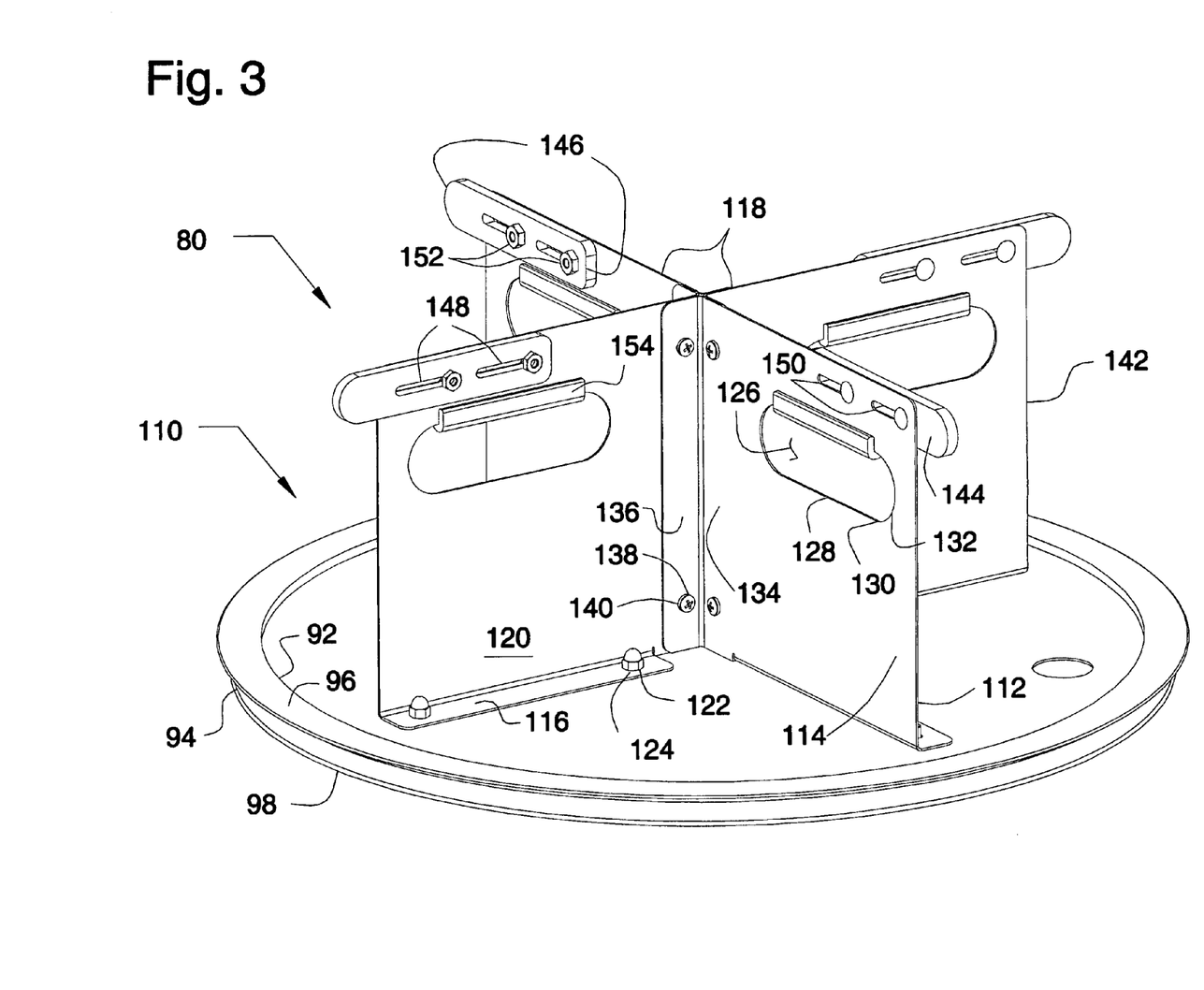
FIG. 3 is a pictorial view of the seam member.

The pot assembly 2 further includes a sealing member 80, best shown in FIGS. 2 and 3. The sealing member 80 is positioned within the preestablished volume "V". The sealing member 80 has a plate 82 formed from a relative thin sheet material and has an outer circumference 84 spaced from the inside 12 of the wall member 10 a preestablished distance. As an alternative any thickness of the sheet could be used without changing the essence of the invention. A vent hole 86 is positioned in the plate 82 and a seal 88 is positioned in the vent hole 86. A sealing mechanism 90 has an inner portion 92 which is removably attached to the outer circumference 84 of the plate 82. The sealing mechanism 90, in this application, defines a dual sealing member 94 having a top sealing portion 96 and a bottom sealing portion 98, all of which are best shown in FIG. 3. As an alternative, a single or greater than two sealing mechanisms could be used. The sealing mechanism 90 is sealingly connected with the inside 12 of the pot 4.

The sealing member 80, in this application, further includes a support and guiding member 110, best shown in FIG. 3. As an alternative, the support and guiding member 110 could be eliminated; however, it is difficult to keep the plate 82 flat and maintain a good seal. In this application, the support and guiding member 110 has a plurality of spoke members 112 attached to the sealing member 80. In this application, four spoke members 112 are used, but as an alternative three or more spoke member 112 could be used. Each of the plurality of spoke members 112 defines a vertical plate 114 having a base end 116 being attached to the sealing member 80 and a handle end 118 spaced from the base end 116. In this application, the base end 116 has a plate member 120 extending therefrom at a 90 degree angle. A plurality of holes 122 are positioned in the base end 116 and extend through the plate 82. A plurality of bolts and nuts 124 attach the spoke members 112 to the sealing member 80. Other means of attaching such as welding, brazing, or riveting could be used to attach the plurality of spoke members 112 to the sealing member 80. Further, the plate member 120 could be eliminated if another means of attaching is used. And, many other methods or processes could be used to provide a guide means for the plate 82 without changing the gist of the invention. A handle portion 126 is defined near the handle end 118 by a generally rectangular opening 128 having each of a plurality of corners 130 defined by a radiused portion 132. The handle portion 126 is spaced from the handle end 118 a preestablished distance. Other means for providing the handle portion 126 could be employed without changing the essence of the invention. For example, a plate could be formed at the handle end 118, bent at a 90 degree angle or welded thereto to provide the handle portion 126. The vertical plate 114 further includes a first end 134 being attached to another one of the plurality of spoke members 112. In this application, a wing member 136 is attached to the first end 134 at a 90 degree angle and has a plurality of holes 138 therein. Another plurality of bolts and nuts 140 attach respective ones of the wing members 136 of the plurality of spoke members 112 to each other. As an alternative, the first end 134 of each of the plurality of spoke members 112 could be attached by rivets or by welding or brazing. Or, as another alternative, the first end 134 of each of the plurality of spoke members 112 could be welded or brazed. Or, as another alternative the plurality of spoke members 112 could be separate, not connected one to another. The vertical plate 114 further includes a second end 142. The second end 142 is spaced from the outer circumference 84 of the plate 82 and is spaced from the inside 12 of the wall member 10 a preestablished distance to provide a clearance therebetween. Attached to the vertical plate 114 near the handle end 118 is an adjustable slide member 144. The adjustable slide member 144, in this application, is rectangular in configuration and has a pair of slide ends 146 and a pair of slotted holes 148 are interposed the pair of slide ends 146. In this application, the adjustable slide members 144 are made of a bearing material, such as a plastic or nylon material which will prevent scratching of the interior of the fermentor. A pair of holes 150 are positioned in the vertical plate 114 and are interposed the handle portion 126 and the handle end 118, these holes 150 could also be slotted. A pair of bolts and wing nuts 152 are positioned in the pair of holes 148 and the pair of slotted holes 148 allowing one of the pair of slide ends 146 to be in contacting relationship "CR" or spaced from "SF" the inside 12 of the wall member 10. In operation, one of the pair of slide ends 146 on each of the vertical plates 114 is in contacting relationship "CR" with the inside 12 of the wall member 10. In this application, a cushioning member 154 is positioned in each of the handle portions 126.

Further included in the fermentor and press assembly 1 is a receptacle, or collector bottle or carboy 160, best shown in FIG. 1, defining an inlet and outlet end 162 and a volume retention portion 164. Positioned in the inlet and outlet end 162 is a flexible cap or stopper 166 having a pair of ends 168, a sealing surface 170 interposed the pair of ends 168 and a pair of openings 172 interposed the pair of ends 168. The sealing surface 170 of the stopper 166 has a generally tapered configuration between the pair of ends 168. A first tube 180 or racking cane is positioned in one of the pair of openings 172 and has an outlet end 182 positioned within the volume retention portion 164 of the collector bottle 160. As an alternative, the racking cane of the first tube could be eliminated without changing the gist of the invention, An inlet end 184 of the first tube 180 is connected to the second end 48 of the drain valve 44. A second tube 190 is positioned in the other one of the pair of openings 172 and has a first end 192 positioned within the volume retention portion 164 near the inlet and outlet end 162 of the collector bottle 160. A second end 194 of the second tube 190 is connected to an inlet end 196 of a one way valve 198 in a conventional manner. An outlet end 200 of the one way valve 198 is connected to a first end 201 of a third tube 202 in a conventional manner and has a fluid passage therein. As and alternative the one way valve 198 could be eliminated. The third tube 202 has a second end 205 connected to a pump 206. In this application, the pump 206 is a vacuum pump. As an alternative, the pump 206 could be of a positive displacement model which will also draw a partial vacuum. However, a vacuum pump will generally create a greater vacuum. If the positive displacement model pump is used it is recommended that a sediment filter 208, best shown in FIG. 5, be placed in the line since a positive displacement pump functions poorly with sediments in the liquid. In this application, at least a portion of each of the first tube 180, the second tube 190 and the third tube 202 are transparent enabling a visual flow of fluid therethrough and are generally flexible verses being rigid. As and alternative design an opaque tube and/or a rigid tube could be used without changing the gist of the invention. The vacuum pump 206 will create approximately one atmosphere of vacuum or about twelve to fifteen pounds per square inch of pressure. In this application, the vacuum pump is electrically operated and has a pressure gage attached thereto to visually indicate the pressure being delivered.

Figure 4:
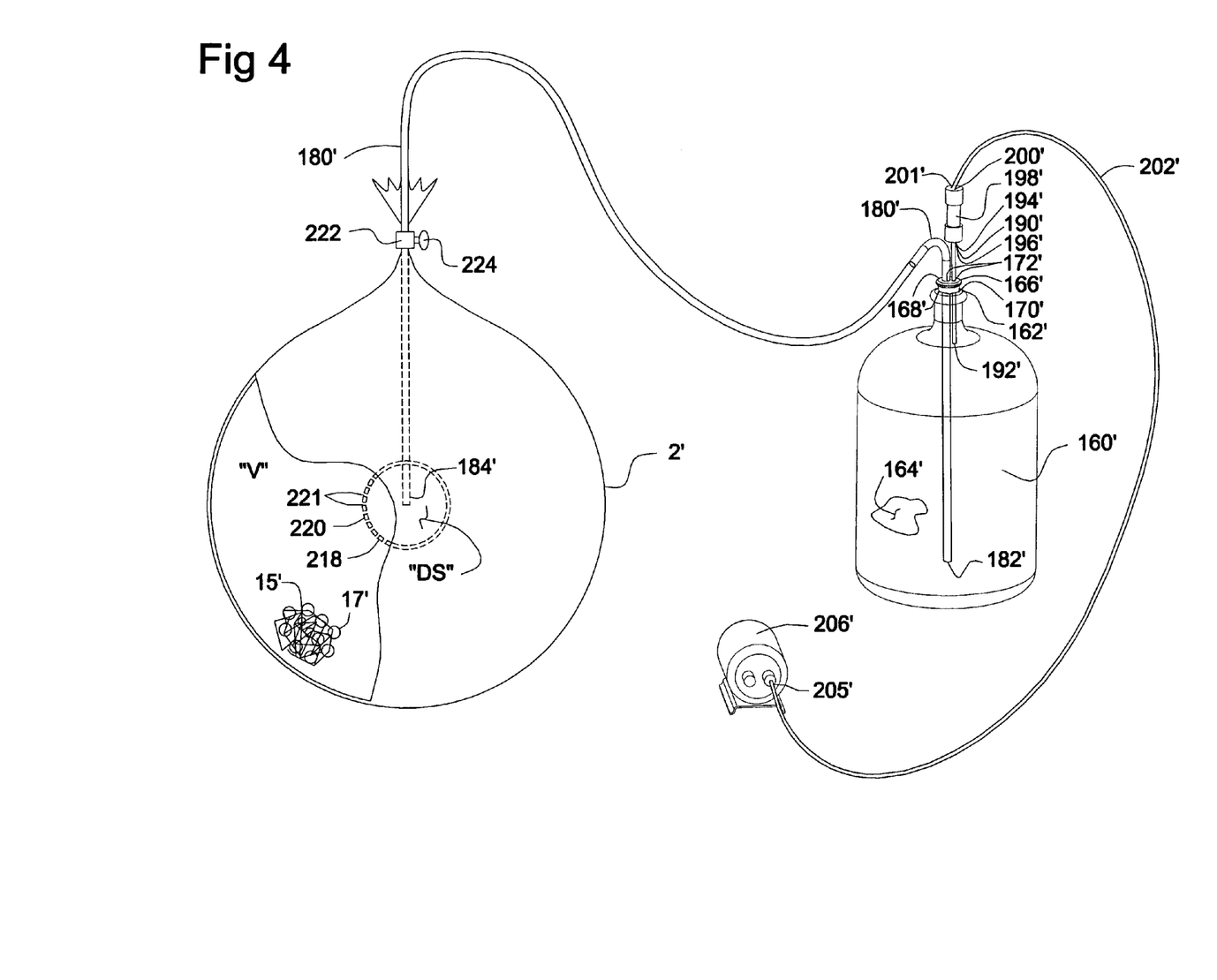
FIG. 4 is a view of an alternate embodiment of the invention.

In an alternative embodiment, best shown in FIG. 4 and labeled with "'" numbers representing previously designated elements, the fermentor and press assembly 2' includes a porous hollow collector mechanism 218 having an inlet end 184' of a first tube or racking cane 180' connected thereto. The porous hollow collector mechanism 218 in the embodiment shown has a spherical configuration defined by a perforated outer wall member 220 having a plurality of holes, slots or openings 221 therein. It is understood that the porous collector mechanism could be cylindrical, disc shaped, or any number of suitable shapes. The porous collector mechanism 218 is relatively rigid and has the characteristic to resist collapsing or resisting the design vacuum or pressure of at least one (1) atmospheres of pressure. If a pressure device is used a much higher pressure can be withstood by the mechanism 218. Defined within the perforated outer wall member 220 is a drain space "DS". A first end 192' of a second tube 190' is positioned within a volume retention portion 164' of a receptacle, or collector bottle or carboy 160'. A second end 194' of the second tube 190' is connected to a pump 206'. The porous collector mechanism 218 and a portion of the first tube 180' is positioned within a flexible pot or bag 2'. The bag 2' in this application is made of plastic and has an opening or inlet 222 therein. The bag 2' defines a preestablished volume "V'". The bag 2' is capable of having a fermentable fruit or must 15 and future pomace 16' disposed at least partially within the preestablished volume "V'". With the porous collector mechanism 218 positioned within the bag 2' and the fermentable fruit or must 15 and future pomace 16' disposed at least partially within the preestablished volume "V'" and the first tube 180' extending through the opening or inlet 222, the opening or inlet 222 is sealingly closed about the first tube 180' with the inlet end 184' positioned within the drain space "DS" and the outlet end 182' external of the opening or inlet 222, positioned within the receptacle or collector bottle 160'. A clamp 224 is fixedly attached over the bag 2' and the first tube 180' sealingly connecting the first tube 180' and the bag 2'. The outlet end 182' of the first tube 180' is fluidly connected to a pump 206' by a second tube 190', as defined earlier. As an alternative, the pump 206' could be a vacuum pump 206' and have a one way valve or check valve or flow stopping device since functionally a gas or gasses can pass therethrough but not a liquid. The valve 198' is interposed the second tube 190' and the vacuum pump 206'. As a further alternative, the pump 206' can be substituted for with a liquid pump capable of drawing at least a partial vacuum such as a diaphragm or other positive displace pump, however, if the positive displace pump is used it is recommended that a sediment filter 208' be installed since the positive displace pump does not handle solids very well.

As an alternative and can be furthered included in this application, is a container of sanitizer 250 used as a sanitizer and for its lubricating quality.

Figure 5:
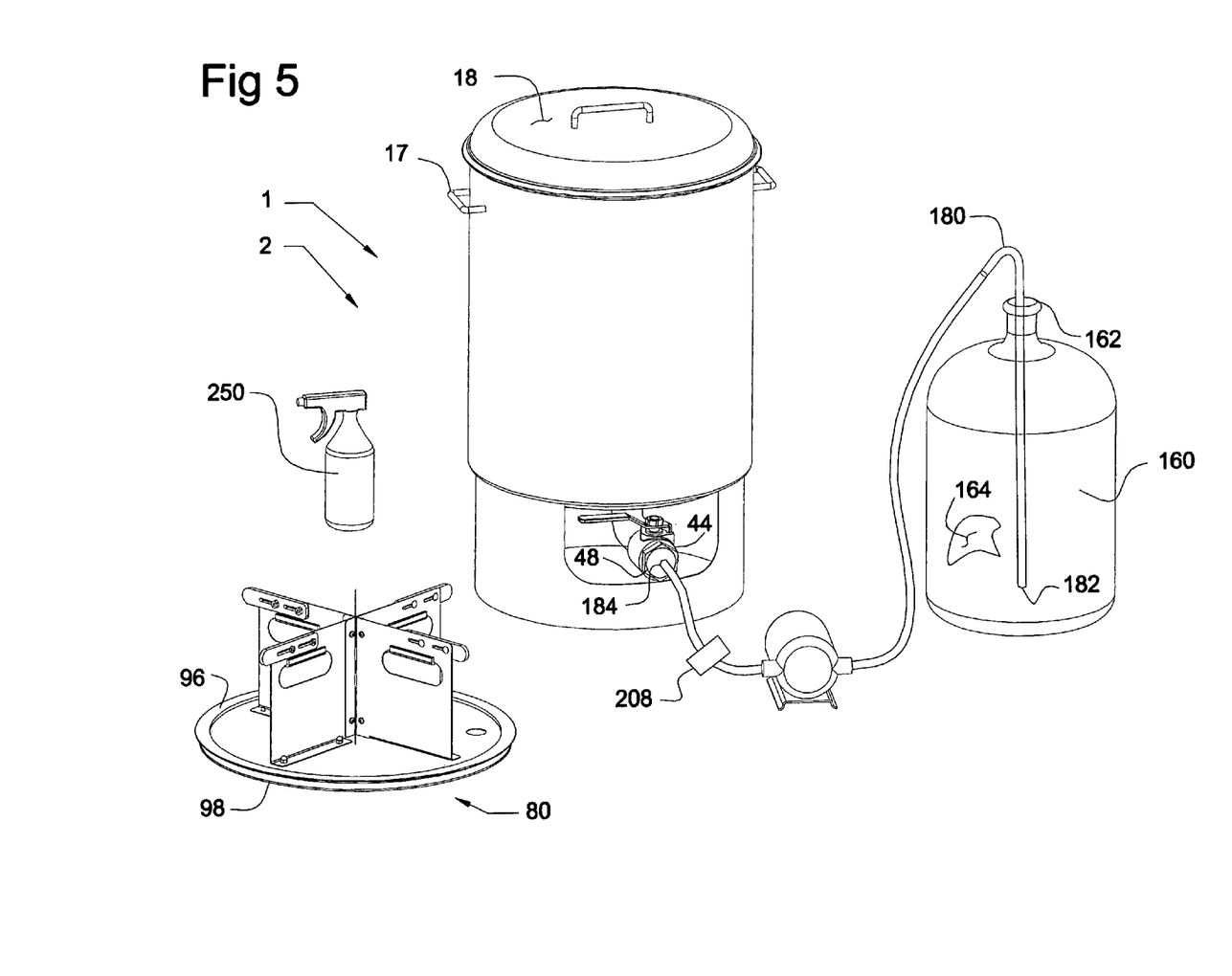
FIG. 5 is an exploded pictorial view of an alternate configuration of the fermentor and press assembly or mechanism.

FIG. 5 is another alternative to the invention and shows a composite of a portion of the components of the invention. The pump 208 is a positive displacement pump positioned within the first tube 180. The inlet end 184 of the first tube 180 is connected to the second end 48 of the drain valve 44. The sediment filter 208 and the pump 208 are positioned in the first tube 180 and are interposed the second end 48 of the drain valve 44 and the outlet end 182 of the first tube 180. The sediment filter 208 is interposed the drain valve 44 and the pump 206. The second end 182 of the first tube is positioned in the volume retention portion 164 of the receptacle or collector bottle 160. Many of the above components have been eliminated with this alternate design. For example, some of the components are the second tube 190 and the cap or stopper 166.

INDUSTRIAL APPLICABILITY

In operation, the bottom portion 40 of the base 36 is place on a flat or nearly level surface. The first end 46 of the drain valve 44 is removably positioned in the drain hole 28 of the pot 4. Using the pair of handles 17, the pot 4 is positioned on the top portion 38 of the base 36. Thus, the recess 24 of the pot 40 nests within the base 36 creating a stable interface between the base 36 and the pot 4. The "U" configuration of the slot 42 is aligned with the drain valve 44. The valve lever 50 is physically accessible externally of the base 36 and pot 4.

To insure sanitation, the container of sanitizer with its lubricating quality is used as needed. The spacer mechanism 62 is positioned within the pot 4 and is nested within the recess 24. The spacer mechanism 62 is in contact with the bottom 8 of the pot 4. Next, the false bottom 60 is positioned within the pot 4. The bottom surface 66 of the false bottom 60 is in contact with the spacer mechanism 62 and the outer portion 70 of the circumference "C" is in contact with the shelf 22. With the hole 68 positioned over the stud 26, the nut 72 is assembled on the stud 26. Thus, the relative position of the bottom 8 of the pot 4, the spacer mechanism 62 and the false bottom 60 are secured and established creating the drain space "DS".

The must 15 and future pomace 16, fermentable materials, such as grapes and other fruits or pulp material is added to the pot 4. The must 15 and future pomace 16 is in contacting relationship with the false bottom 60. Fermentation of the must 15, fermentable materials, such as grapes and other fruits or pulp material is allowed to occur or ferment The seal member 80 can be positioned within the pot 4. However, under normal operation the seal member is not placed in the fermentor until after fermentation is complete and the pressing operation is about to begin. To enhance the assembly and positioning of the seal member 80 the sanitizer is added to the inside 12 of the circular wall member 10 of the pot 4 and to the sealing mechanism 90 of the seal member 80. And, with the vent hole 86 open, the seal member 80 is force into contact with the now fermented or fermenting must 15 and future pomace 16. The vent hole 86 enables one to determine the relative position of the seal member 80 to the now fermented or fermenting must 15 and further pomace 16 and allows air to escape verses creating a resistance during assembly. After properly positioning the seal member 80 relative to the must 15 and future pomace 16 the seal 88 is positioned in the vent hole 86. Experimentation has shown that to keep the sealing mechanism 90 and the seal member 80 in sealing alignment with the inside 12 of the pot 4 the support and guiding member 110 is very helpful, although not required to function adequately. For example, after positioning the seal member 80 as defined above or prior to positioning the seal member 80 relative to the inside 12 of the pot 40 the support and guiding member 110 is attached to the seal member 80. If attaching the support and guide member 110 after positioning the seal member 80 relative to the must 15 and future pomace 16 the bolts of the plurality of bolts and nuts 124 must be positioned in the seal member 80. To assembly the support and guiding member 110 to the seal member 80, attach each of the plurality of spoke members 112 to the seal member 80, in this application by the plurality of bolts and nuts 124. Attach the adjustable slide member 144 to the vertical plate 114 of each of the plurality of spoke member 112 using the pair of bolts and wing nuts 152. The slotted holes 148 in the vertical plates 114 enable the relative position of the slide end 146 to the inside 12 of the pot 4 to be adjusted determining the contacting relationship "CR" between the slide end 146 and the inside 12 of the pot 4. Similarly but with much more ease of positioning and assembly, by using the handle portions 126 provide and the adjustable slide members 144 the positioning and assembly of the seal member 80 can be easily established. And, with the support and guiding member 110 in place any vertical movement of the seal member 80 will prevent cocking and loss of the sealing relationship of the sealing mechanism 90 with the inside 12 of the pot 4. And again, since the support and guide members 110 have plastic or nylon material interfacing with the inside 12 of the pot 4 scratching of the inside 12 surface of the pot 4 is prevented establishing a better sealing interface.

Externally of the pot 4 the inlet end 184 of the first tube 180 is connected to the second end 48 of the drain valve 44 and the outlet end 182 of the first tube 180 is positioned within the volume retention portion 164 of the collector bottle 160. The first end 192 of the second tube 190 is positioned within the volume retention portion 164 of the collector bottle 160 and the second end 194 is connected to the inlet end 196 of the one way valve 198. The outlet end 200 of the one way valve 198 is connected to the first end 210 of the third tube 202 and the second end 205 is connected to the vacuum pump 206. The one way valve 198 may be eliminated, but to protect the vacuum pump 206 the one way valve 198 is recommended. When positioning the outlet end 182 of the first tube and the first end 192 of the second tube 190 within the volume retention portion 164 care should be taken to locate the first end 182 of the first tube 180 relative to the inlet and outlet end of the collector bottle 160. For example, the outlet end 182 of the first tube 180 should be spaced from the inlet and outlet end 162 of the collector bottle 160 a preestablished distance and the first end 192 of the second tube 190 should be spaced from the inlet and outlet end 162 of the collector bottle 160 a preestablished distance being less than the preestablished distance of the spacing of the outlet end 182 of the first tube 180 from the inlet and outlet end 162 of the collector bottle 160. The relative position of the tubes 180,190 will not prevent the function of the invention, but good practice advises one to put the outlet end 182 of the first tube 180 within the liquid or as low as possible to reduce splashing and oxidation; and with the first end 192 of the second tube 190 above the liquid and the outlet end 182 of the first tube 180 below the first end 192 of the second tube 190 there is less of a change for the liquid to enter the pump 206.

Thus, with valve lever 50 in the closed position 54 and the assembly of the fermentor and press assembly 1 completed the operation of the unit can be defined. After fermentation of the now fermented must 15 and future pomace 16, with the valve lever 50 positioned in the open position 52, the "free run" and liquid can be collected or removed from the pot 4. The pump, in this application the vacuum pump, 206 is actuated and a partial vacuum is drawn within the drain space "DS" and liquid begins to flow through the first tube 180 into the collector bottle 160. A portion of the "free run" can be siphoned without use of the vacuum pump, as is well known in the art. There is little pressure applied to the wall member 10 until the "free run" liquid is gone. The semi dry pomace 16,16' will mechanically support the wall member 10,10'. The greater the vacuum the harder the pomace 16,16' and the greater support is applied to resisting the collapsing of the wall member 10,10'. The bottom 8 needs a greater resistance to collapsing due to the vacuum force than the side member 10,10'. With the must 15,15' and further pomace 16,16' in contact with the container or bag 2' collapsing of the container or bag 2' is resisted. The one way valve 198 essentially prevents flow of the liquid from the collector bottle 160 to the vacuum pump 206. Since the tubes 180,190, in this application, are transparent, a flow of fluid can be visually observed in the tubes 180,190 insuring proper operation of the system. As the vacuum increased, atmospheric pressure forces the seal member 80 to move toward the bottom 8 of the pot 4. Thus, the volume above the drain space "DS" is reduce and the liquid is drawn from the pomace 16,16' and collected with the drain space DS" and flows into the collector bottle 160.

With the existing fermentor and press combination the transfer from the fermentor to the press is eliminated, thus, resulting in detrimental risk of contamination and oxidation. Furthermore, by eliminating the transfer, mess from spilled pomace 16,16', splashing in the press and spills transferring once again to the final aging fermentor are eliminated. This is particularly valuable for the home wine maker. Lastly, the elimination of these transfers results in a significant time savings in the overall process which is valuable to both the home and commercial winemaker. It is also to be noted that this invention, while primarily intended for the production of wines fermented on-the-skin, may also be used as a press for extracting juice for other products.

LIST OF ELEMENTS

Title: Combined Fermentor and Press

File: Winefermentorandpresspa

1 Fermentor and Press Assembly
2 Pot Assembly or Container
4 Pot
6 Top or Inlet—Pot
8 Bottom—Pot
10 Wall Member—Pot
12 Inside—Pot
14 Outside—Pot
15 Must
16 Pomace
17 Pair of Handles—Pot
18 Lid—Pot
20 Ledge—Pot
22 Shelf—Pot
24 Recess—Pot
26 Stud—Pot
28 Drain Hole—Pot
30
32
34
36 Base
38 Top Portion—Base
40 Bottom Portion—Base
42 Slot—Base
44 Drain Valve
46 First End—Drain Valve
48 Second End—Drain Valve
50 Valve Lever—Drain Valve
52 Open Position—Drain Valve
54 Closed Position—Drain Valve
56
58
60 False Bottom
62 Spacer Mechanism
64 Top Surface—False Bottom
66 Bottom Surface—False Bottom
68 Plurality of Openings—False Bottom
69 Hole—False Bottom
70 Outer Portion—False Bottom
72 Nut—False Bottom
74
76
78
80 Sealing Member
82 Plate—Sealing Member
84 Outer Circumference—Sealing Member
86 Vent Hole—Sealing Member
88 Seal—Vent Hole
90 Sealing Mechanism—Sealing Member
92 Inner Portion—Sealing Mechanism
94 Dual Sealing Member—Sealing Mechanism
96 Top Sealing Portion—Dual Sealing Member
98 Bottom Sealing Portion—Dual Sealing Member
100
102
104
106
108
110 Support and Guiding Member
112 Plurality of Spoke Members—Support and Guiding Member
114 Vertical Plate—Spoke Member
116 Base End—Vertical Plate
118 Handle End—Vertical Plate
120 Plate Member—Base End
122 Plurality of Holes—Plate Member
124 Plurality of Bolts and Nuts—Support and Guiding Member
126 Handle Portion—Plate Member
128 Opening—Handle Portion
130 Plurality of Corners—Handle Portion
132 Radiused Portion—Handle Portion
134 First End—Plate Member
136 Wing Member—Plate Member
138 Plurality of Holes—Wing Member
140 Plurality of Bolts and Nuts—Wing Member
142 Second End—Vertical Plate
144 Adjustable Slide Member—Support and Guiding Member 146 Pair of Slide Ends—Adjustable Slide. Member
148 Pair of Slotted Holes—Adjustable Slide Member
150 Pair of Holes—Vertical Plate
152 Pair of Bolts and Wing Nuts—Adjustable Slide Member
154 Cushioning Member—Handle Portion
156
158
160 Receptacle or Collector Bottle
162 Inlet and Outlet End—Bottle
164 Volume Retention Portion—Bottle
166 Cap or Stopper
168 Pair of Ends—Stopper
170 Sealing Surface—Stopper
172 Pair of Openings—Stopper
174
176
178
180 First Tube
182 Outlet End—First Tube
184 Inlet End—First Tube
186
188
190 Second Tube
192 First End—Second Tube
194 Second End—Second Tube
196 Inlet End—One Way Valve
198 One Way Valve
200 Outlet End—One Way Valve
201 First End—Third Tube
202 Third Tube
204
205 Second End—Third Tube
206 Pump—Vacuum or Positive Displacement
208 Sediment Filter
210
212
214
216
218 Porous Hollow Collector Mechanism
220 Perforated Outer Wall Member—Porous Hollow Collector Mechanism
221 Plurality of Holes, Slots or Openings
222 Opening or Inlet—Bag or Pot
224 Clamp
226
228
250 Container of Sanitizer and Lubricant

What is claimed is:

1. A combined fermentor and press assembly, said fermentor and press assembly being adapted to allow fermentation and separation of a liquid from a must and a future pomace, comprising:
   a pot, said pot having one of a top or inlet, a bottom, an inside and a preestablished volume, said pot having a ledge spaced from said bottom forming a shelf within the pot, a drain hole being positioned in said bottom of said pot;
   a flow stopping device is connected to said drain hole in said pot, said flow stopping device being movable between an open position and a closed position;
   a spacer being positioned in said pot and being in contact with said bottom;
   a false bottom having a circumference and being positioned in said pot, said false bottom having a capability of permitting a flow of liquid therethrough, an outer portion of the false bottom's circumference being positioned on said shelf;
   a drain space being created between said false bottom and said bottom of said pot, said drain space and a valve being in fluid communication;
   a portion of said preestablished volume having said must and said future pomace added within at least a portion of said preestablished volume;
   a sealing member being positioned within said pot within said preestablished volume, an outer circumference of said sealing member being spaced from said inside of said pot, a sealing mechanism being positioned between said outer circumference and said inside of said pot;
   wherein, said sealing member includes a support and guiding member having a plurality of vertical plates each having an adjustable slide member, at least one slide member having a slide end;
   an inlet end of a first tube being attached to said valve and an outlet end of said first tube being connected to a receptacle, said receptacle having a volume retention portion;
   a first end of a second tube being connected to said volume retention portion of said receptacle and a second end of said second tube being connected to a pump.

2. The combined fermenter and press assembly of claim 1 wherein said pot has a circular configuration.

3. The combined fermenter and press assembly of claim 1 wherein said spacer being formed as a part of said pot.

4. The combined fermentor and press assembly of claim 1 wherein said false bottom having a plurality of holes therein extending between a top surface and a bottom surface.

5. The combined fermenter and press assembly of claim 4 wherein said outer portion of said false bottom being void of said plurality of holes.

6. The combined fermenter and press assembly of claim 1 wherein said sealing member having a vent hole.

7. The combined fermentor and press assembly of claim 6 wherein said vent hole in said sealing member having a seal therein.

8. The combined fermentor and press assembly of claim 1 wherein said sealing mechanism having an inner portion being removably attached to said outer circumference.

9. The combined fermentor and press assembly of claim 1 wherein said sealing member including a support and guiding member.

10. The combined fermentor and press assembly of claim 9 wherein said support and guiding member including a plurality of adjustable slide members.

11. The combined fermenter and press assembly of claim 9 wherein said support and guiding member including a pair of handles.

* * * * *